(12) United States Patent
Dong et al.

(10) Patent No.: US 11,911,984 B2
(45) Date of Patent: Feb. 27, 2024

(54) LAMINATING EQUIPMENT FOR RFID TIRE TAG

(71) Applicants: QINGDAO HIGHWAY IOT TECHNOLOGY CO., LTD., Qingdao (CN); MESNAC CO., LTD., Qingdao (CN)

(72) Inventors: Lanfei Dong, Qingdao (CN); Luxin Wang, Qingdao (CN); Haijun Chen, Qingdao (CN); Haibo Qi, Qingdao (CN); Qiang Tong, Qingdao (CN)

(73) Assignees: QINGDAO HIGHWAY IOT TECHNOLOGY CO., LTD., Qingdao (CN); MESNAC CO., LTD., Qingdao (CN)

( * ) Notice: Subject to any disclaimer, the term of this patent is extended or adjusted under 35 U.S.C. 154(b) by 521 days.

(21) Appl. No.: 16/765,147

(22) PCT Filed: Mar. 23, 2018

(86) PCT No.: PCT/CN2018/080110
§ 371 (c)(1),
(2) Date: May 18, 2020

(87) PCT Pub. No.: WO2019/095597
PCT Pub. Date: May 23, 2019

(65) Prior Publication Data
US 2020/0346424 A1    Nov. 5, 2020

(30) Foreign Application Priority Data
Nov. 17, 2017    (CN) .......................... 201711153748.5

(51) Int. Cl.
*B29D 30/00*    (2006.01)
*B65H 37/04*    (2006.01)
(Continued)

(52) U.S. Cl.
CPC ......... *B29D 30/0061* (2013.01); *B65G 47/92* (2013.01); *B65H 20/02* (2013.01);
(Continued)

(58) Field of Classification Search
CPC .... B29D 30/00; B29D 30/0061; B65G 47/92; B65H 20/02; B65H 37/04; B65H 41/00;
(Continued)

(56) References Cited

U.S. PATENT DOCUMENTS

| 7,690,578 B2 * | 4/2010 | Kawai .................... G06K 19/02 |
| | | 235/492 |
| 2004/0095244 A1 * | 5/2004 | Conwell .......... G06K 19/07764 |
| | | 428/354 |
| 2010/0078487 A1 * | 4/2010 | Baba ................ G06K 19/07718 |
| | | 235/492 |

FOREIGN PATENT DOCUMENTS

| CN | 101596988 | 12/2009 |
| CN | 201834584 | 5/2011 |

(Continued)

*Primary Examiner* — Nguyen Q. Ha
(74) *Attorney, Agent, or Firm* — Jiwen Chen; Joywin IP Law PLLC (57) ABSTRACT

Some embodiments of the present disclosure provide a laminating equipment for a Radio Frequency Identification (RFID) tire tag. The laminating equipment includes: a frame, a feeding mechanism, wherein the feeding mechanism is provided on the frame, and a laminating mechanism, wherein the laminating mechanism is provided on the frame. The laminating mechanism is configured to press rubber and an electronic chip of materials to be fed from the feeding mechanism. The feeding mechanism includes a support frame, a coiling portion which is provided on the support frame, and a driving wheel which is rotationally provided on the support frame. One end of the material to be fed is provided on the coiling portion, and the other end cooperates with the driving wheel, so as to move the material to be fed (Continued)

under a driving of the driving wheel. The technical solution of the present disclosure may solve a problem in the conventional art that the efficiency of manual feeding is low.

14 Claims, 7 Drawing Sheets (51) Int. Cl.
*B65G 47/92* (2006.01)
*B65H 20/02* (2006.01)
*B65H 41/00* (2006.01)
*G06K 19/077* (2006.01)

(52) U.S. Cl.
CPC .............. *B65H 37/04* (2013.01); *B65H 41/00* (2013.01); *G06K 19/07722* (2013.01); *G06K 19/07764* (2013.01); *B65H 2701/1244* (2013.01); *B65H 2801/93* (2013.01)

(58) Field of Classification Search
CPC ........ B65H 2701/1244; B65H 2801/93; G06K 19/07; G06K 19/07722; G06K 19/07764
See application file for complete search history.

(56) References Cited

FOREIGN PATENT DOCUMENTS

| | | |
|---|---|---|
| CN | 205204446 | 5/2016 |
| JP | 07172605 | 7/1995 |
| JP | 2012131139 | 7/2012 |

* cited by examiner

LAMINATING EQUIPMENT FOR RFID TIRE TAG

This is a U.S. national stage application of PCT Application No. PCT/CN2018/080110 under 35 U.S.C. 371, filed Mar. 23, 2018 in Chinese, claiming priority of Chinese Application No. 201711153748.5, filed Nov. 17, 2017, all of which are hereby incorporated by reference.

TECHNICAL FIELD

The present disclosure relates to a technical field of laminating equipment, and in particular to a laminating equipment for a Radio Frequency Identification (RFID) tire tag.

BACKGROUND

In a traditional tread manufacturing technique, a vulcanization tag is a unique Identifier (ID) of identity information of a tyre in the process of production and transfer. With the continuous promotion of intelligent manufacturing, a RFID tire tag will be used widely under the circumstances of continuous improvement of the automation level in the tyre industry.

In a related art, when a RFID tire tag is manufactured, a production mode of picking, placing, laminating, and cutting manually is adopted, therefore the production efficiency is low, and a requirement of a tyre production enterprise for the number of tags cannot be satisfied.

SUMMARY

Some embodiments of the present disclosure provide a laminating equipment for a RFID tire tag, for solving a problem of low production efficiency caused by feeding, placing and laminating manually in the related art.

In order to achieve the purpose, some embodiments of the present disclosure provide a laminating equipment for a RFID tire tag. The laminating equipment includes: a frame, a feeding mechanism, is the feeding mechanism being provided on the frame, and a laminating mechanism, the laminating mechanism being provided on the frame. The laminating mechanism is configured to press rubber and an electronic chip of materials to be fed from the feeding mechanism. The feeding mechanism includes a support frame, a coiling portion which is provided on the support frame, and a driving wheel which is rotationally provided on the support frame. One end of the material to be fed is provided on the coiling portion, and the other end cooperates with the driving wheel, so as to move the material to be fed under a driving of the driving wheel.

In an exemplary embodiment, the feeding mechanism may further include a film-stripping rotation shaft, wherein the film-stripping rotation shaft is rotationally provided on the support frame. The materials to be fed include a material belt, the electronic chip, and a protection film provided corresponding to the material belt. The electronic chip is provided between the material belt and the protection film. One end of the protection film is provided on the film-stripping rotation shaft. The driving wheel is meshed with the material belt.

In an exemplary embodiment, there are a plurality of dentate bulges provided on a peripheral surface of the driving wheel, and the plurality of dentate bulges are uniformly provided around a circumferential direction of the driving wheel at an interval. There are through holes provided on the material belt, wherein the through holes are matched with the dentate bulges.

In an exemplary embodiment, the feeding mechanism further includes a driving portion and a gearing portion. Wherein, the driving portion is in driving connection with the driving wheel. The gearing portion is connected with the driving wheel and the film-stripping rotation shaft respectively, so that the driving wheel and the film-stripping rotation shaft rotate synchronously.

In an exemplary embodiment, the feeding mechanism may further include a supporting platform which is connected with the support frame. The supporting platform is at one side, facing the film-stripping rotation shaft, of the driving wheel.

In an exemplary embodiment, the laminating equipment may further include a pick-up mechanism of manipulator which is provided on the frame. The pick-up mechanism of manipulator includes: a supporting seat, and a pick-up portion which is provided being movable vertically relative to the supporting seat. The pick-up portion includes a first cylinder and a pick-up head which is connected with the first cylinder. The pick-up head is provided with a passage for placing a magnetic member. The first cylinder is configured to drive the magnetic member to move in the passage. The magnetic member is provided with a first position for absorbing a part to be picked up and a second position for loosening the part to be picked up.

In an exemplary embodiment, there is an installation through hole provided on the pick-up head. The installation through hole forms the passage. The first cylinder is provided at the installation through hole, and one end of a piston rod of the first cylinder is inserted into the installation through hole and matched with the magnetic member, so as to drive the magnetic member to switch between the first position and the second position.

In an exemplary embodiment, the pick-up portion includes two first cylinders and two pick-up heads provided corresponding to the two first cylinders. Wherein, the magnetic member is provided in each of the pick-up heads.

In an exemplary embodiment, the pick-up mechanism of manipulator further includes a second cylinder. The second cylinder is provided on the supporting seat. Under an action of the second cylinder, the pick-up portion moves vertically relative to the supporting seat.

In an exemplary embodiment, the pick-up mechanism of manipulator further includes: a rotating part, wherein the rotating part is connected with the supporting seat, and a driving motor, wherein the driving motor is connected with the rotating part so as to drive the rotating part to rotate.

In an exemplary embodiment, the rotating part is a rotating arm or a rotating disk. The pick-up mechanism of manipulator includes a plurality of pick-up portions. When the rotating part is the rotating arm, the plurality of pick-up portions are provided on the rotating part at an interval.

In an exemplary embodiment, the pick-up portion includes a plurality of pick-up heads. The supporting seat is selectively connected with one of the plurality of pick-up heads.

In an exemplary embodiment, the laminating mechanism may further include: a laminating platform, and a pressing part, wherein the pressing part is provided on the laminating platform. The pressing part is provided movably relative to the laminating platform.

In an exemplary embodiment, the laminating mechanism may further include: a waste tank, wherein the waste tank is provided on the frame. The waste tank is located below the feeding mechanism.

In an exemplary embodiment, the feeding mechanism may further include a guiding portion which is connected with the support frame. The guiding portion is provided below the driving wheel, and is configured to guide the material belt of the material to be fed to enter into the waste tank.

By adopting some embodiments of the present disclosure, in which the feeding mechanism feeds automatically, and the laminating mechanism encapsulates the electronic chip, product consistency is good, and efficiency is high. In an exemplary embodiment, because one end of the material to be fed is provided on the coiling portion, and the other end cooperates with the driving wheel, the rotation of the driving wheel drives the material to be fed to move, and the movement of the material to be fed drives the coiling portion to rotate; in this way, automatic uncoiling of the coiling portion is realized, and automatic feeding is completed. Therefore, automatic feeding after manually feeding is ensured, and efficiency is improved; and moreover, there is no manmade waste, and a feeding process is smooth.

BRIEF DESCRIPTION OF THE DRAWINGS

The accompanying drawings of the specification constituting a part of the application are used for providing further understanding of the present disclosure. Schematic embodiments of the present disclosure and description thereof are used for illustrating the present disclosure and not intended to form an improper limit to the present disclosure. In the accompanying drawings.

The above accompanying drawings include the following reference numbers.

10: pick-up portion; 11: first cylinder; 12: pick-up head; 121: passage; 13: magnetic member; 20: supporting seat; 21: rotating part; 22: mounting plate; 23: driving motor; 24: reducer; 25: second cylinder; 30: feeding mechanism; 31: support frame; 32: coiling portion; 33: film-stripping rotation shaft; 34: driving wheel; 341: dentate bulge; 35: driving portion; 36: limiting part; 37: guiding portion; 38: position sensor; 39: supporting platform; 40: material to be fed; 41: material belt; 42: electronic chip; 50: synchronous belt; 60: laminating mechanism; 61: laminating platform; 62: pressing roller; 70: storage box; 80: winding part; and 90: frame.

DETAILED DESCRIPTION OF THE EMBODIMENTS

It is to be noted that the embodiments in the application and the characteristics in the embodiments can be combined under the condition of no conflicts. The present disclosure is described below with reference to the accompanying drawings and the embodiments in detail.

In the present disclosure and the embodiments of the present disclosure, materials to be fed 40 are the materials which include an electronic chip 42, and a part to be picked up is the electronic chip 42. The electronic chip 42 is a RFID tire chip. The part laminated by the laminating equipment is the RFID tire tag.

Figure 1:
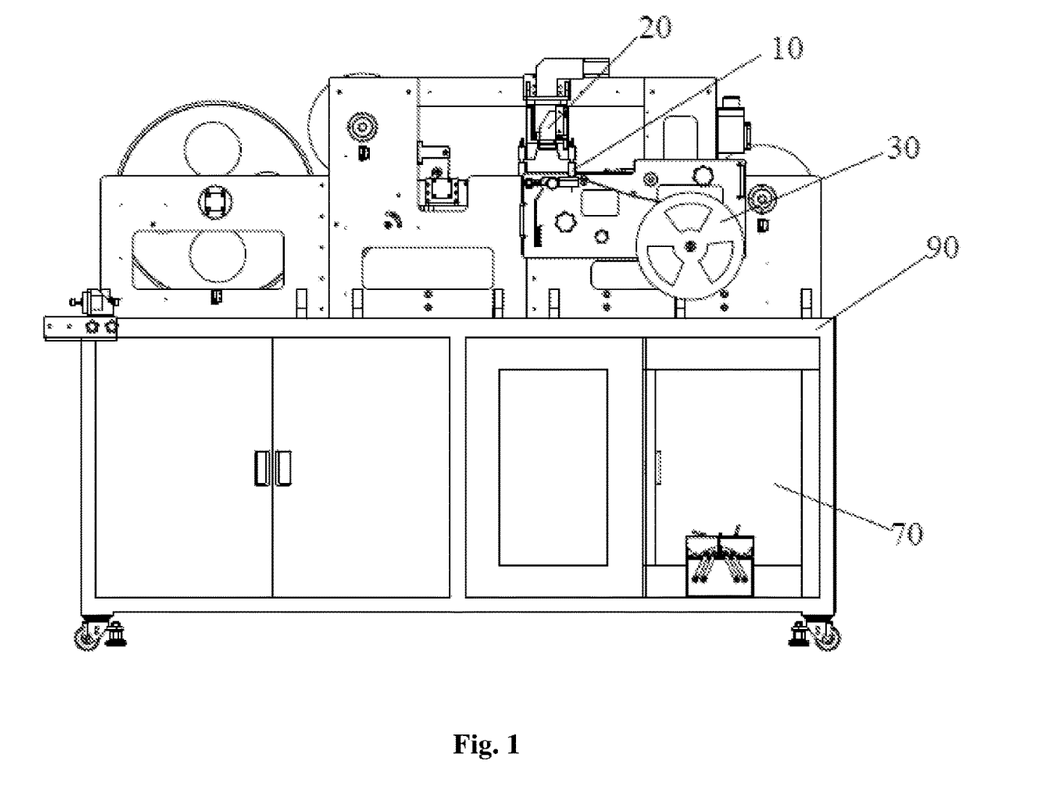
FIG. 1 is a schematic diagram of a main view structure of an embodiment of a laminating equipment for a RFID tire tag according to the present disclosure.
Figure 2:
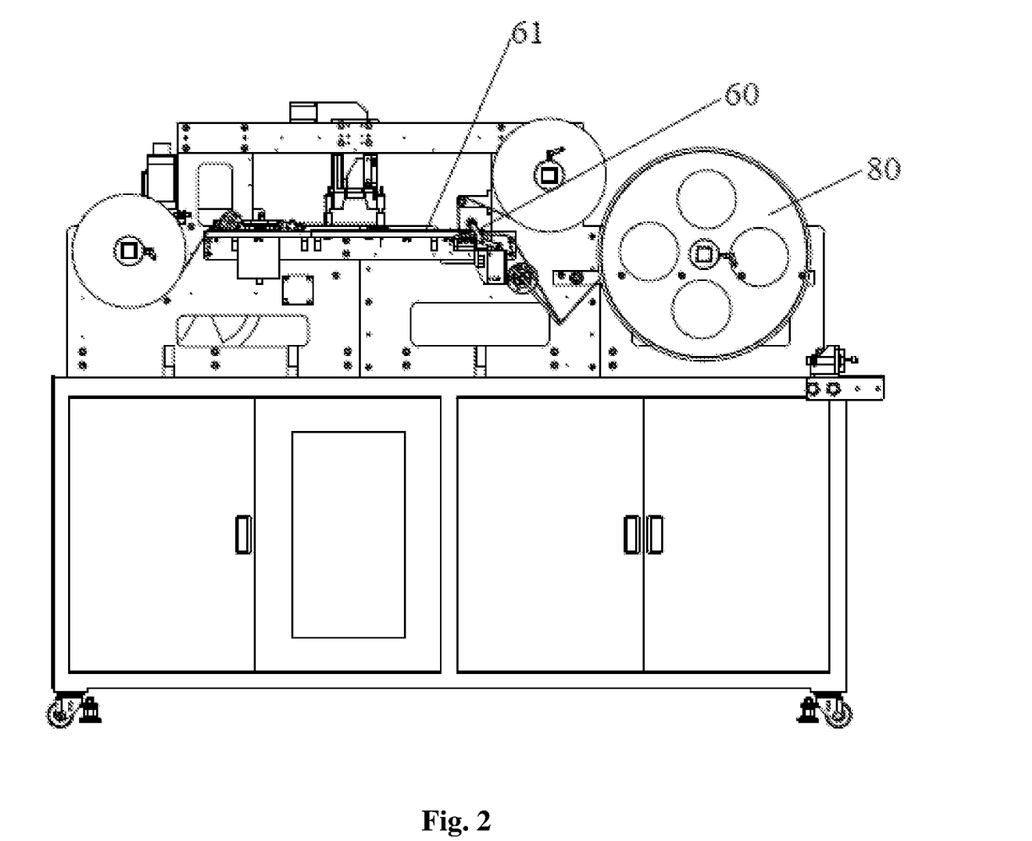
FIG. 2 is a schematic diagram of a top view structure of FIG. 1.

As shown in FIG. 1 and FIG. 2, some embodiments of the present disclosure provide a laminating equipment for a RFID tire tag. The laminating equipment includes: a frame 90, a feeding mechanism 30, which is provided on the frame 90, and a laminating mechanism 60, which is provided on the frame 90. The laminating mechanism 60 is configured to press rubber and the electronic chip 42 of the materials to be fed 40 from the feeding mechanism 30.

Figure 3:
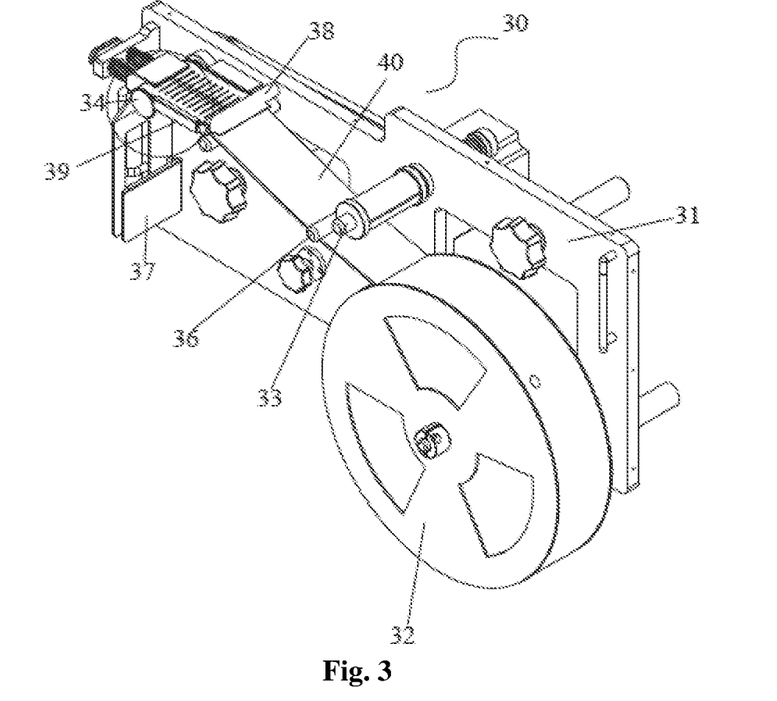
FIG. 3 is a schematic diagram of a three-dimensional structure of an embodiment of a feeding mechanism in FIG. 1.
Figure 4:
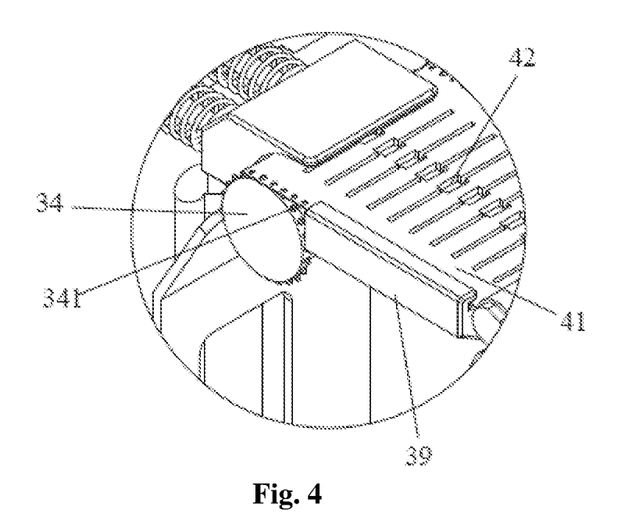
FIG. 4 is a partial enlarged drawing of FIG. 3.
Figure 5:
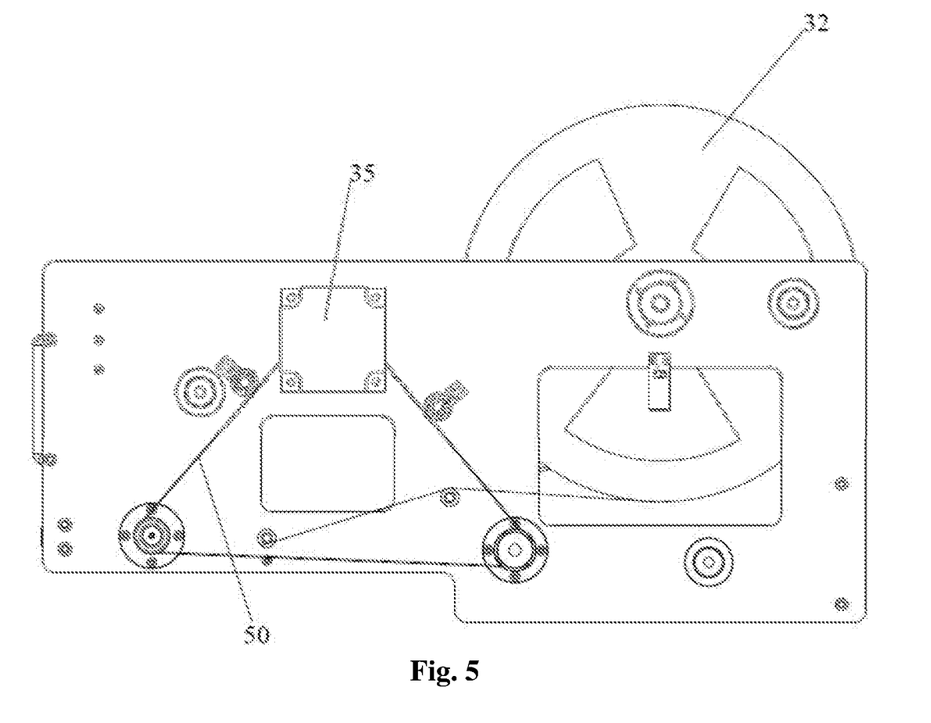
FIG. 5 is a top view of the feeding mechanism in FIG. 3.

As shown in FIG. 3, FIG. 4 and FIG. 5, in an exemplary embodiment, the feeding mechanism 30 includes a support frame 31, a coiling portion 32 which is provided on the support frame 31, and a driving wheel 34 which is rotationally provided on the support frame 31. One end of the material to be fed 40 is provided on the coiling portion 32, and the other end cooperates with the driving wheel 34, so as to move the material to be fed 40 under a driving of the driving wheel 34.

By adopting the embodiment of the present disclosure, in which the feeding mechanism 30 feeds automatically, and the laminating mechanism 60 encapsulates the electronic chip 42, mechanized production may be realized, and product consistency is good; and moreover, automated production may be realized, and production efficiency is high.

In an exemplary embodiment, because one end of the material to be fed 40 is provided on the coiling portion 32, and the other end cooperates with the driving wheel 34, a rotation of the driving wheel 34 drives the material to be fed 40 to move, and a movement of the material to be fed 40 drives the coiling portion 32 to rotate; in this way, automatic uncoiling of the coiling portion 32 is realized, and automatic feeding is completed. Therefore, automatic feeding after manually feeding is ensured, and efficiency is improved; and moreover, there is no manmade waste, and a feeding process is smooth.

Figure 6:
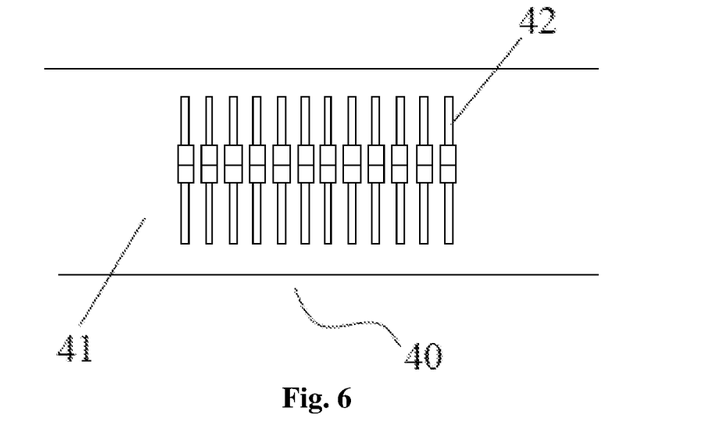
FIG. 6 is a main view of materials to be fed (not including a protection film) in FIG. 3.

FIG. 6 is a schematic diagram after the material to be fed 40 is uncoiled. The materials to be fed 40 include a material belt 41, the electronic chip 42 and a protection film provided corresponding to the material belt 41. The plurality of electronic chips 42 are provided at intervals along a length direction of the material belt 41. As shown in FIG. 1 and FIG. 2, in an exemplary embodiment of the present disclosure, the feeding mechanism 30 may further include a film-stripping rotation shaft 33. The film-stripping rotation shaft 33 is rotationally provided on the support frame 31. The electronic chip 42 is provided between the material belt 41 and the protection film. One end of the protection film is provided on the film-stripping rotation shaft 33. The driving wheel 34 is meshed with the material belt 41.

Through the above setting, the rotation of the driving wheel 34 drives the material to be fed 40 to move, and the movement of the material to be fed 40 drives the coiling portion 32 to rotate. Because one end of the protection film is provided on the film-stripping rotation shaft 33, while the material to be fed 40 moves to realize automatic feeding, with the rotation of the film-stripping rotation shaft 33, the protection film detaches from the electronic chip 42 on the material belt 41, and is winded on the film-stripping rotation shaft 33; then, a film stripping process is completed. The feeding mechanism 30 implements the film stripping process of the material to be fed 40 while realizing the automatic feeding. The feeding process and the film stripping process are carried out simultaneously without need of manual work, thereby improving efficiency. Moreover, all of the film-stripping rotation shaft 33, the driving wheel 34 and coiling portion 32 are provided on the support frame 31, so the structure of the equipment is compact, and the volume is small.

As shown in FIG. 4, in an exemplary embodiment of the present disclosure, there are a plurality of dentate bulges 341 provided on a peripheral surface of the driving wheel 34, and the plurality of dentate bulges 341 are uniformly provided around a circumferential direction of the driving wheel 34 at an interval. The material belt 41 is provided with a plurality of through holes, the plurality of through holes are matched with the dentate bulges 341.

Through the above setting, when rotating, the driving wheel 34 drives the material belt 41, which cooperates with the dentate bulges 341 through the through holes, to move forward, thereby conveying the material belt. Through meshed setting between each of the dentate bulges 341 and a corresponding each of the through holes, a rotary motion of the driving wheel 34 is converted into a linear motion of the material belt 41 and the electronic chip 42. Therefore, a transmission power is large, a conveying process is smooth, and the automation of a feeding process is realized.

As shown in FIG. 3, in an exemplary embodiment of the present disclosure, the feeding mechanism may further include a limiting part 36. The limiting part 36 is connected with the support frame 31, and contacts the protection film.

Through the above setting, the limiting part 36 contacts the protection film and supports it, thereby preventing the stripped protection film from adhering to the material to be fed 40 whose film is not stripped. Meanwhile, after the limiting part 36 is provided, when the film-stripping rotation shaft 33 winds the stripped protection film, indirect contact is formed between the stripped protection film and the material to be fed 40, thereby preventing an acting force in the process that the film-stripping rotation shaft 33 winds the protection film from directly acting on the material to be fed 40. Direct acting of the acting force will cause the material to be fed 40 to wave or shake, which impacts an automatic feeding process of the feeding mechanism 30.

As shown in FIG. 3 and FIG. 5, in an exemplary embodiment of the present disclosure, the feeding mechanism may further include a driving portion 35 and a gearing portion. The driving portion 35 is in driving connection with the driving wheel 34. The gearing portion is connected with the driving wheel 34 and the film-stripping rotation shaft 33 respectively, so that the driving wheel 34 and the film-stripping rotation shaft 33 rotate synchronously.

Through the above setting, in the embodiment, the driving portion 35 drives the driving wheel 34 and the film-stripping rotation shaft 33 to rotate synchronously, which realizes synchronous implementation of the automatic feeding process and the automatic film stripping process.

In an exemplary embodiment, the driving portion 35 is one of a servo motor and a stepping motor.

As shown in FIG. 3 and FIG. 5, in an exemplary embodiment of the present disclosure, the gearing portion is a synchronous belt 50. The rotation direction of the driving wheel 34 is as same as the rotation direction of the film-stripping rotation shaft 33.

In the embodiments of the present disclosure, the rotation direction of the driving wheel 34 is as same as the rotation direction of the film-stripping rotation shaft 33, that is, if the driving wheel 34 and the film-stripping rotation shaft 33 are rotated along the anticlockwise direction in FIG. 1, the feeding process and the film stripping process are implemented simultaneously. Meanwhile, taking the synchronous belt 50 as the gearing portion may absorb a shock, thereby ensuring a running process to be smooth.

Of course, in some alternative embodiments not described in the present disclosure, the rotation direction of the driving wheel 34 and the rotation direction of the film-stripping rotation shaft 33 may also be set to be opposite, which may also realize the synchronous implementation of the feeding process and the film stripping process.

Moreover, the gearing portions of other manners may also be provided. All embodiments which may realize synchronous rotation of the driving wheel 34 and the film-stripping rotation shaft 33 should fall within the protection scope of the present disclosure.

As shown in FIG. 3 and FIG. 4, in an exemplary embodiment of the present disclosure, the feeding mechanism may further include a support platform 39 which is connected with the support frame 31. The supporting platform 39 is at one side, facing the film-stripping rotation shaft 33, of the driving wheel 34.

Through the above setting, the supporting platform 39 supports the material to be fed 40 which is conveyed through the rotation of the driving wheel 34, thereby ensuring the material belt 41 to keep stable and smooth in the feeding process, and preventing shaking or elastic deformation of the material belt 41 from impacting the pickup of the chip.

As shown in FIG. 3, in an exemplary embodiment of the present disclosure, the feeding mechanism may further include, along a feeding direction of the material to be fed 40, a position sensor 38 which is provided at an upper part of the supporting platform 39.

Through the above setting, the position sensor 38 is configured to detect whether there is the electronic chip 42 of the material to be fed 40 on the supporting platform 39. When there is no the electronic chip 42 on the material to be fed 40, the driving wheel 34 rotates to drive the material to be fed 40 to move, thereby continuing the feeding process.

In the present embodiment, both the driving wheel 34 and the film-stripping rotation shaft 33 rotate intermittently, that is, when the electronic chip 42 reaches the supporting platform 39, the driving wheel 34 stops rotating, and after all the electronic chips 42 on the supporting platform 39 are taken away by a pick-up portion of manipulator or manually, the driving wheel 34 continues to rotate, the material belt 41 where the electronic chip 42 is taken away moves downward bypassing the driving wheel 34, and the material to be fed 40 winded on the coiling portion 32 continues to move, under the driving of the driving wheel 34, towards the supporting platform 39 to wait the next pick-up action.

Of course, the driving wheel 34 and the film-stripping rotation shaft 33 may also be providing to rotate continuously according to actual needs. If so, the pick-up mechanism of manipulator for picking up the electronic chip 42 is required to cooperate with the feeding mechanism 30, thereby realizing the synchronous implementation of a process of automatically picking up the electronic chip 42, the film stripping process and a process of conveying the electronic chip 42.

As shown in FIG. 3, in an exemplary embodiment of the present disclosure, the laminating mechanism may further include: a waste tank, which is provided on the frame 90. The waste tank is located below the feeding mechanism 30. The feeding mechanism may further include a guiding portion 37 which is connected with the support frame 31. The guiding portion 37 is provided below the driving wheel 34, and is configured to guide the material belt 41 of the material to be fed 40 to enter into the waste tank.

Through the above setting, after the film stripping process and the feeding process of the material to be fed 40 are completed (that is, the electronic chip 42 is picked up), the material belt 41 continues moving downward under the driving of the driving wheel 34, and is guided by the guiding portion 37 to enter into the waste tank, thereby preventing waste from falling to pollute a working environment.

As shown in FIG. 3, in an exemplary embodiment of the present disclosure, the support frame 31 includes a first vertical plate and a second vertical plate which is connected with the first vertical plate. Both the coiling portion 32 and the driving wheel 34 are provided on the first vertical plate. The guiding portion 37 is a guiding plate. The guiding plate and the second vertical plate are provided at an interval.

Through the above setting, the parts of the feeding mechanism are distributed on the support frame 31 reasonably; the guiding portion 37 and the second vertical plate are provided at an interval to jointly guide the material belt 41 to enter into the waste tank after the feeding process is completed, thereby ensuring the completion of the feeding process. Applying the feeding mechanism for the RFID tire tag of the present embodiment to feed the electronic tag implements the automatic feeding process after manually feeding and mechanizes automatic discharging without need of manual intervention and without requirements on working personnel, thereby avoiding manmade wastes and poor production. By implementing the automatic feeding of the RFID tire tag, a chip supplying function of an automatic packaging line for the RFID tire tag is realized, which fills up the technical gap of automated chip feeding in an early stage of embedding an RFID chip in the rubber industry.

As shown in the accompanying drawings from FIG. 7 to FIG. 10, the exemplary embodiment provides a pick-up mechanism of manipulator. The pick-up mechanism of manipulator includes a supporting seat 20 and a pick-up portion 10. The pick-up portion 10 is provided being movable vertically relative to the supporting seat 20. The pick-up portion 10 includes a first cylinder 11 and a pick-up head 12 which is connected with the first cylinder 11. The pick-up head 12 is provided with a passage 121 for placing a magnetic member 13. The first cylinder 11 is configured to drive the magnetic member 13 to move in the passage 121. The magnetic member 13 is provided with a first position for absorbing a part to be picked up and a second position for loosening the part to be picked up.

Through the above setting, the pick-up portion 10 is movable vertically relative to the supporting seat 20, which ensures that the pick-up portion 10 may get close to the part to be picked up, thereby facilitating the implementation of a pick-up operation. When the magnetic member 13 is at the first position, a distance between the magnetic member 13 and the part to be picked up is shortest, and the magnetic member 13 may absorb the part to be picked up. When the magnetic member 13 is at the second position, a distance between the magnetic member 13 and the part to be picked up is beyond a pick-up distance of the magnetic member 13, and the magnetic member 13 loosens the part to be picked up. The pick-up mechanism of manipulator picks up the part to be picked up based on the principle of magnetism, so the pick-up way is reliable, and the operation is easy to be implemented. Meanwhile, the magnetic member 13 in the pick-up head 12 is driven using the cylinder, so the structure is simple, and the operation is smooth. In the solution, by using the magnetic member 13 to pick up and loosen the part to be picked up, a problem in the related art of low efficiency caused by manually picking and placing the part to be picked up is prevented.

Figure 10:
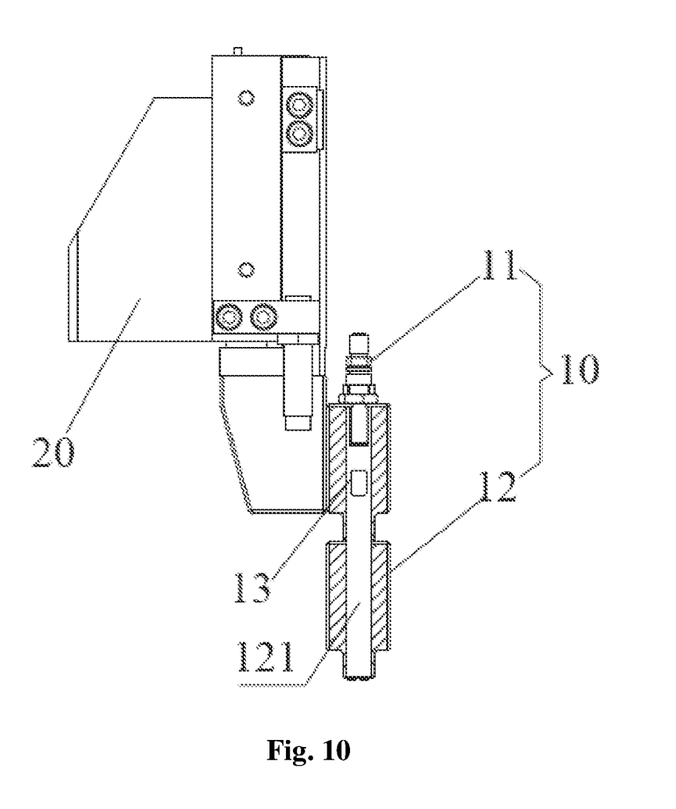
FIG. 10 is a broken-out section view of FIG. 9.

As shown in FIG. 10, in an exemplary embodiment of the present disclosure, there is an installation through hole provided on the pick-up head 12. The installation through hole forms the passage 121. The first cylinder 11 is provided at the installation through hole, and one end of a piston rod of the first cylinder 11 extends into the installation through hole and cooperates with the magnetic member 13, so as to drive the magnetic member 13 to switch between the first position and the second position.

Through the above setting, one end of the piston rod of the first cylinder 11 extends into the installation through hole to directly drive the magnetic member 13, thereby ensuring that the magnetic member 13 may switch between the first position and the second position smoothly. Meanwhile, position switching of the magnetic member 13 in the passage 121 realizes a function of picking up and loosening the part to be picked up. The magnetic member 13 does not contact the part to be picked up directly, thereby preventing a manmade secondary pollution, ensuring the cleanliness of the part to be picked up, and ensuring that the performance of the part to be picked up will not be damaged.

As shown in FIG. 10, in an exemplary embodiment of the present disclosure, one end, facing the magnetic member 13, of the piston rod is provided with an absorbing portion which may absorb the magnetic member 13. The distance between the absorbing portion and the magnetic member 13 is greater than or equal to the pick-up distance of the magnetic member 13.

Through the above setting, when it is needed to absorb the part to be picked up, because the distance between the absorbing portion and the magnetic member 13 is greater than and equal to the pick-up distance of the magnetic member 13, the extension of the piston rod may enable the magnetic member 13 to reach a magnetic attraction distance range of absorbing the part to be picked up, thereby absorbing the part to be picked up successfully. When it is needed to loosen the part to be picked up, under an absorbing action of the piston rod, the magnetic member 13 gets away from the part to be picked up until it leaves the magnetic attraction distance range of the magnetic member 13 and the part to be picked up, thereby realizing the separation of the magnetic member 13 and the part to be picked up.

In an exemplary embodiment, the absorbing portion is a magnet which may generate an action of magnetic force with the magnetic member 13.

Of course, in the alternative embodiments of the present disclosure, the piston rod may also be connected with the magnetic member 13. The first cylinder 11 may further include a cylinder body. The piston rod extends out and retracts relative to the cylinder body, so as to enable the magnetic member 13 to switch between the first position and the second position.

Figure 9:
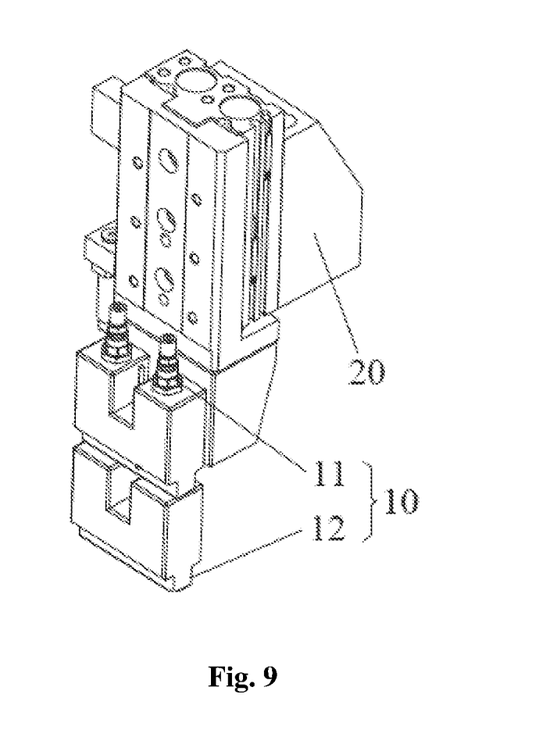
FIG. 9 is a schematic diagram of a three-dimensional structure where a pick-up portion and a supporting seat of the pick-up mechanism of manipulator are connected in FIG. 7.

As shown in FIG. 9 and FIG. 10, in an exemplary embodiment of the present disclosure, the pick-up portion 10 includes two first cylinders 11 and two pick-up heads 12 provided corresponding to the two first cylinders 11. The magnetic member 13 is provided in each of the pick-up heads 12.

Through the above setting, the two first cylinders 11 drive the magnetic members 13 in the pick-up heads 12 respectively and correspondingly. The two magnetic members absorb from two ends of the same part to be picked up at the same time, which provides a greater magnetic attraction force, thereby ensuring that the part to be picked up may be picked up smoothly, and preventing the part to be picked up from falling due to local stress on it.

In an exemplary embodiment of the present disclosure, a needle-type cylinder is selected as the first cylinder 11. The whole pick-up portion 10 has a small volume and a compact structure.

Figure 7:
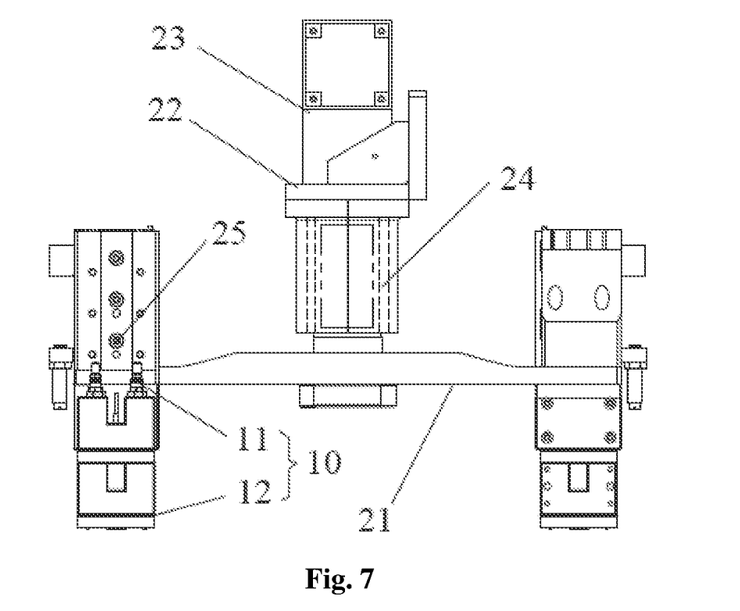
FIG. 7 is a main view of a pick-up mechanism of manipulator of the laminating equipment in FIG. 1.
Figure 8:
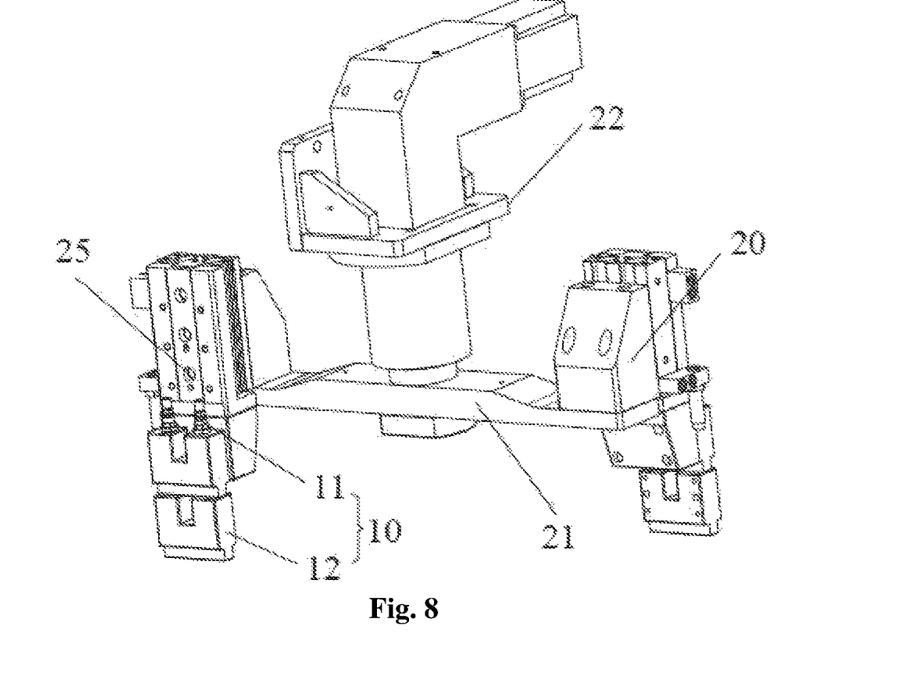
FIG. 8 is a schematic diagram of a three-dimensional structure of the pick-up mechanism of manipulator in FIG. 7.

As shown in FIG. 7 and FIG. 8, in an exemplary embodiment of the present disclosure, the pick-up mechanism of manipulator may further include a rotating part 21 which is connected with the supporting seat 20, and a driving motor 23. The driving motor 23 is connected with the rotating part 21 to drive the rotating part 21 to rotate.

Through the above setting, the supporting seat 20 is connected with the rotating part 21, thereby ensuring, through rotation, the pick-up head 12 to reach a position of picking up the part to be picked up. The driving motor 23 drives the rotating part 21, which makes the pick-up mechanism of manipulator simple in structure and convenient in operation.

In an exemplary embodiment, the driving motor 23 is one of the servo motor and the stepping motor.

As shown in FIG. 7 and FIG. 8, in an exemplary embodiment of the present disclosure, the pick-up mechanism of manipulator may further include a mounting plate 22. The driving motor 23 is provided on the mounting plate 22.

Through the above setting, the driving motor 23 is provided on the mounting plate 22, thereby ensuring the driving motor 23 to run smoothly, and reducing the vibration.

As shown in FIG. 8, in an exemplary embodiment of the present disclosure, the rotating part 21 is a rotating arm. The pick-up mechanism of manipulator includes a plurality of pick-up portions 10. The plurality of pick-up portions 10 are provided on the rotating part 21 at an interval.

In an exemplary embodiment, the pick-up mechanism of manipulator includes two pick-up portions 10. The two pick-up portions 10 are provided on two ends of the rotating part 21 respectively and correspondingly. When the pick-up mechanism of manipulator performs a pick-up operation, the two pick-up portions 10 pick up the part to be picked up and loosen the part to be picked up respectively, thereby implementing synchronous operation of double work positions, and improving the production efficiency.

Furthermore, by using the pick-up mechanism of manipulator, the electronic chip may be picked up from a specified position and placed to another specified position after being rotated.

Of course, in the alternative embodiments not described in the present disclosure, the rotating part 21 may also be a rotating disk. The plurality of pick-up portions 10 are provided on the rotating part 21 at an interval along a circumferential direction. In this way, the pick-up mechanism of manipulator may operate at multiple work positions according to actual needs, thereby improving efficiency.

As shown in FIG. 7, in an exemplary embodiment of the present disclosure, the pick-up mechanism of manipulator may further include a reducer 24. One end of the reducer 24 is connected with the driving motor 23, and the other end is connected with the rotating part 21.

Through the above setting, the setting of the reducer 24 ensures the rotating part 21 to run smoothly, thereby ensuring that the pick-up operation of the pick-up mechanism of manipulator is implemented smoothly.

As shown in FIG. 7 and FIG. 8, in an exemplary embodiment of the present disclosure, the pick-up mechanism of manipulator may further include a second cylinder 25. The second cylinder 25 is provided on the supporting seat 20. Under the action of the second cylinder 25, the pick-up portion 10 moves vertically relative to the supporting seat 20.

Through the above setting, the second cylinder 25 enables the pick-up portion 10 to move vertically relative to the supporting seat 20, which ensures that the pick-up portion 10 may get close to the part to be picked up vertically, so the operation is simple and it is convenient to pick.

As shown in FIG. 10, in an exemplary embodiment of the present disclosure, the magnetic member 13 is a Neodymium magnet.

Particularly, the Neodymium magnet has a stable property. Using the Neodymium magnet as the magnetic member 13 generates a good absorption force (namely the magnetic attraction force) between the magnetic member 13 and the part to be picked up, thereby ensuring the stable pick-up operation of the pick-up mechanism of manipulator. Of course, in the alternative embodiments not described in the present disclosure, the magnetic member 13 may also be other magnetic members.

Using the pick-up mechanism of manipulator of the present embodiment to pick up the electronic chip 42 realizes a chip placing function before an automatic encapsulation of the RFID tire chip, which fills up the technical gap of automated chip feeding in an early stage of embedding an RFID chip in the rubber industry. The solution realizes automated pick-up, and prevents the manmade secondary pollution caused by picking up the chip manually, and twisting and bumping among the chips. Moreover, using the solution, the production efficiency is high, there is no technical requirement on the personnel, no manmade waste and poor production is generated, and a manual process may be replaced completely.

Figure 11:
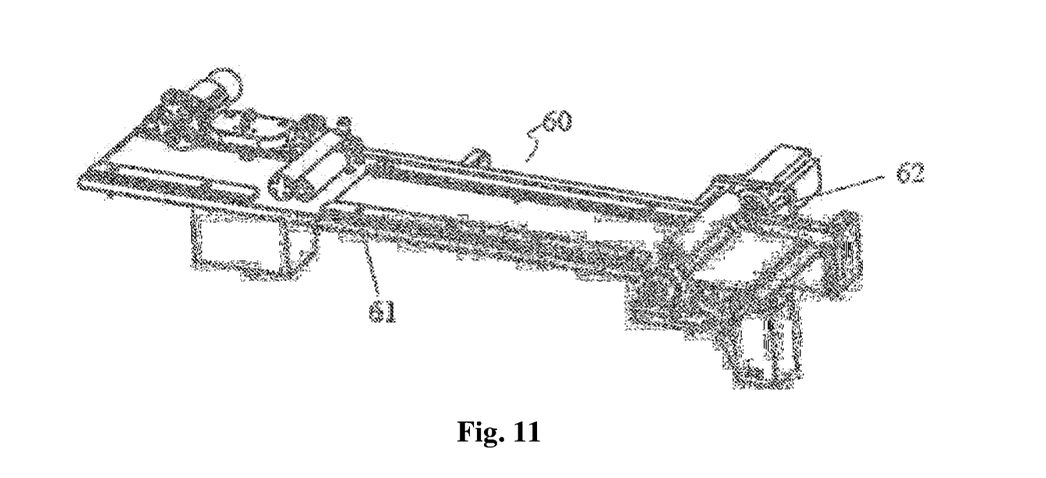
FIG. 11 is a schematic diagram of a main view structure of a laminating mechanism of the laminating equipment in FIG. 1.

As shown in FIG. 11, in an exemplary embodiment of the present disclosure, the laminating mechanism 60 includes a laminating platform 61 and a pressing part provided on the laminating platform 61. The pressing part is provided being movable relative to the laminating platform 61.

In an exemplary embodiment, the pressing part is a pressing roller 62. An encapsulation way of the electronic chip 42 includes that: after the electronic chip 42 is placed on a single layer of rubber, a layer of rubber is covered on an exposed side of the electronic chip 42, and finally, encapsulation is completed through the pressing roller 62 by virtue of the adhesive property of rubber. Moreover, there is a coder and an accessory of the coder provided on the laminating platform 61. A moving-forward distance of the material belt is recorded through the coder, so as to ensure the working continuity of the laminating mechanism.

Of course, in the alternative embodiments, a vertically pressing way may also be used to encapsulate the electronic chip 42 and the rubber together.

In an exemplary embodiment of the present disclosure, the laminating equipment may further include a winding part 80. Using the winding part 80 may wind the encapsulated electronic chip 42, and then it is convenient to carry and store the electronic chip.

In an exemplary embodiment of the present disclosure, the laminating equipment may further include a storage box 70 provided on the frame 90, and then it is convenient to store maintaining tools in the storage box, thereby being convenient to get the tools.

In the present embodiment, a function of the laminating equipment is placing the electronic chip 42 at the specified position of the rubber, and pressing them to obtain a semi-finished product. The laminating equipment is mainly composed of the feeding mechanism 30, the pick-up mechanism of manipulator, the laminating mechanism 60 and the winding part 80. Through a servo (stepping) motor control technology in combination with the feeding mechanism, the automatic feeding of the rubber and the electronic chip 42 is realized. By the pick-up mechanism of manipulator, the electronic chip 42 is placed at the specified position. By a pneumatic pressing roller 62, the rubber and the electronic chip 42 are pressed.

The laminating equipment of some embodiments of the present disclosure has the following advantages: the mechanized production may be realized, and the product consistency is good; the automated production may be realized, and the production efficiency is high; after manual feeding, the equipment may automatically run according to preset parameters without need of manual intervention and without requirements on the personnel, and moreover, there is no manmade waste and poor production.

It can be seen from the above description the above embodiments of the present disclosure achieve the following technical effects: the feeding mechanism of the RFID tire tag includes the coiling portion, the film-stripping rotation shaft and the driving wheel. The driving portion drives the driving wheel and the film-stripping rotation shaft to rotate simultaneously, the rotation of the driving wheel drives the material to be fed to move, and the movement of the material to be fed drives the coiling portion to rotate; in this way, the automatic feeding is completed. Meanwhile, the rotation of the film-stripping rotation shaft strips the protection film of the material to be fed and winds it on the film-stripping rotation shaft, which implements the film stripping process of the material to be fed and winds the stripped protection film to keep well, and conducts the automatic feeding and automatic film stripping synchronously. The pick-up mechanism of manipulator includes the supporting seat, the pick-up portion and the rotating arm. The driving motor drives the rotating arm to rotate, so as to make the pick-up portion above the part to be picked up. The second cylinder drives the pick-up portion to move vertically relative to the supporting seat and get close to the part to be picked up. The two first cylinders drive the magnetic members in the two pick-up heads respectively and correspondingly. The two magnetic members absorb simultaneously from the two ends of the same part to be picked up. Through the above pick-up process, the process of picking up the part to be picked up is implemented. The whole pick-up process is simple and smooth, and the operation is convenient; moreover, the secondary pollution of the chip caused by manual pick-up, wastes and poor production are prevented, the automated pick-up of the chip is realized, and the production efficiency is improved.

The above is only the exemplary embodiment of the present disclosure and not intended to limit the present disclosure; for those skilled in the art, the present disclosure may have various modifications and changes. Any modifications, equivalent replacements, improvements and the like within the principle of the present disclosure should fall within the scope of the claims of the present disclosure.

What is claimed is:

1. A laminating equipment for a Radio Frequency Identification (RFID) tire tag, comprising:
    a frame;
    a feeding mechanism, wherein the feeding mechanism is provided on the frame; and
    a laminating mechanism, wherein the laminating mechanism is provided on the frame; the laminating mechanism is configured to press rubber and an electronic chip of materials to be fed from the feeding mechanism;
    wherein, the feeding mechanism comprises a support frame, a coiling portion which is provided on the support frame, and a driving wheel which is rotationally provided on the support frame; one end of the material to be fed is provided on the coiling portion, and the other end cooperates with the driving wheel, so as to move the material to be fed under a driving of the driving wheel, wherein the feeding mechanism further comprises a film-stripping rotation shaft; wherein the stripping rotation shaft is rotationally provided on the support frame; the materials to be fed comprise a material belt, the electronic chip and a protection film provided corresponding to the material belt; the electronic chip is provided between the material belt and the protection film; one end of the protection film is provided on the film-stripping rotation shaft; and the driving wheel is meshed with the material belt.

2. The laminating equipment as claimed in claim 1, wherein there are a plurality of dentate bulges provided on a peripheral surface of the driving wheel, and the plurality of dentate bulges are uniformly provided around a circumferential direction of the driving wheel at an interval; there are through holes provided on the material belt, wherein the through holes are matched with the dentate bulges.

3. The laminating equipment as claimed in claim 1, wherein the feeding mechanism further comprises a driving portion and a gearing portion; wherein the driving portion is in driving connection with the driving wheel; and the gearing portion is connected with the driving wheel and the film-stripping rotation shaft respectively, so that the driving wheel and the film-stripping rotation shaft rotate synchronously.

4. The laminating equipment as claimed in claim 1, wherein the feeding mechanism further comprises a supporting platform which is connected with the support frame; the supporting platform is at one side, facing the film-stripping rotation shaft, of the driving wheel.

5. The laminating equipment as claimed in claim 1, further comprising a pick-up mechanism of manipulator which is provided on the frame; the pick-up mechanism of manipulator comprises:
    a supporting seat; and
    a pick-up portion, wherein the pick-up portion is provided being movable vertically relative to the supporting seat; the pick-up portion comprises a first cylinder and a pick-up head which is connected with the first cylinder; wherein the pick-up head is provided with a passage for placing a magnetic member; the first cylinder is configured to drive the magnetic member to move in the passage; the magnetic member is provided with a first position for absorbing a part to be picked up and a second position for loosening the part to be picked up.

6. The laminating equipment as claimed in claim 5, wherein there is an installation through hole provided on the pick-up head; the installation through hole forms the passage; the first cylinder is provided at the installation through hole, and one end of a piston rod of the first cylinder is inserted into the installation through hole and matched with the magnetic member, so as to drive the magnetic member to switch between the first position and the second position.

7. The laminating equipment as claimed in claim 5, wherein the pick-up portion comprises two first cylinders and two pick-up heads provided corresponding to the two first cylinders; wherein the magnetic member is provided in each of the pick-up heads.

8. The laminating equipment as claimed in claim 5, wherein the pick-up mechanism of manipulator further comprises a second cylinder; wherein the second cylinder is provided on the supporting seat; under an action of the second cylinder, the pick-up portion moves vertically relative to the supporting seat.

9. The laminating equipment as claimed in claim 5, wherein the pick-up mechanism of manipulator further comprises:
   a rotating part, wherein the rotating part is connected with the supporting seat; and
   a driving motor, wherein the driving motor is connected with the rotating part so as to drive the rotating part to rotate.

10. The laminating equipment as claimed in claim 9, wherein the rotating part is a rotating arm or a rotating disk; wherein the pick-up mechanism of manipulator comprises a plurality of pick-up portions; when the rotating part is the rotating arm, the plurality of pick-up portions are provided on the rotating part at an interval.

11. The laminating equipment as claimed in claim 5, wherein the pick-up portion comprises a plurality of pick-up heads; the supporting seat is selectively connected with one of the plurality of pick-up heads.

12. The laminating equipment as claimed in claim 1, wherein the laminating mechanism comprises:
   a laminating platform; and
   a pressing part, wherein the pressing part is provided on the laminating platform; the pressing part is provided movably relative to the laminating platform.

13. The laminating equipment as claimed in claim 1, further comprising a waste tank, wherein the waste tank is provided on the frame, the waste tank is located below the feeding mechanism.

14. The laminating equipment as claimed in claim 13, wherein the feeding mechanism further comprises a guiding portion connected with the support frame; wherein the guiding portion is provided below the driving wheel, and is configured to guide a material belt of the material to be fed to enter into the waste tank.

\* \* \* \* \*